United States Patent
Duan et al.

(10) Patent No.: US 7,647,674 B2
(45) Date of Patent: *Jan. 19, 2010

(54) AUTOMATICALLY OPENING HINGE ASSEMBLY FOR PORTABLE ELECTRONIC DEVICES

(75) Inventors: Chao Duan, Shenzhen (CN); Chia-Hua Chen, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 187 days.

This patent is subject to a terminal disclaimer.

(21) Appl. No.: 11/617,128

(22) Filed: Dec. 28, 2006

(65) Prior Publication Data

US 2008/0034541 A1 Feb. 14, 2008

(30) Foreign Application Priority Data

Jul. 7, 2006 (CN) .................. 2006 1 0061574

(51) Int. Cl.
*E05D 11/10* (2006.01)
(52) U.S. Cl. ...................................... 16/330
(58) Field of Classification Search ............... 16/303, 16/330, 324
See application file for complete search history.

(56) References Cited

U.S. PATENT DOCUMENTS

| 7,117,562 | B2* | 10/2006 | Zuo et al. | 16/303 |
| 7,222,396 | B2* | 5/2007 | Lu et al. | 16/340 |
| 7,383,616 | B2* | 6/2008 | Duan et al. | 16/303 |
| 2006/0242795 | A1* | 11/2006 | Duan et al. | 16/330 |
| 2006/0242796 | A1* | 11/2006 | Duan et al. | 16/330 |
| 2006/0254026 | A1* | 11/2006 | Duan et al. | 16/330 |

* cited by examiner

*Primary Examiner*—Victor Batson
*Assistant Examiner*—Matthew Sullivan
(74) *Attorney, Agent, or Firm*—Steven M. Reiss

(57) ABSTRACT

A hinge assembly (200) includes a shaft (13), a cam (14), a follower (15), a first spring (12), a control member (17), a second spring (16) and a fixing seat (18). The shaft defines an outer screw thread (1320). An inner circumferential wall of the cam defines an inner screw thread (144) is meshed with the outer screw thread of the shaft. The first spring provides an elastic force causing a cam surface of the cam and a latching cam surface of the follower to resist each other. The second spring is positioned between the control member and the follower. The fixing seat has a bottom portion (181) including at least one block and at least one slot adjacent to the at least one block. The at least one block of the control member is received in the at least one receiving groove.

17 Claims, 10 Drawing Sheets

AUTOMATICALLY OPENING HINGE ASSEMBLY FOR PORTABLE ELECTRONIC DEVICES

BACKGROUND OF THE INVENTION

1. Field of the Invention

The present invention relates to hinge assemblies and, particularly, to an automatically opening hinge assembly for foldable devices such as portable telephones, portable computers, and so on.

2. Discussion of the Related Art

At present, perhaps the most popular portable electronic device in the marketplace is the foldable cellular telephone, which generally includes a cover section and a body section. The cover section and the body section are rotatably interconnected through a hinge assembly, for switching the telephone between an in-use position and a closed position.

One kind of hinge assembly employs a cam and a follower, which allows the cover section to fold outwards from the body section and then hold in an open position. The hinge assembly typically includes a cam having a concave portion, a follower having a convex portion, a shaft having a fixing end, and a spring. The cam and the follower are placed around the shaft. The spring resists the follower to make the concave portion tightly contact the convex portion. The cam, the follower, the shaft and the spring are received in a housing. A flip cover rotates about a main body of the mobile phone by overcoming the force of the spring, thus allowing the concave portion to rotate about the convex portion. However, a user must open the mobile phone using both hands. This makes the mobile phone awkward to use in situations when the user has only one hand free.

Therefore, a new hinge mechanism is desired in order to overcome the above-described problems.

SUMMARY OF THE INVENTION

One embodiment of the present hinge assembly includes a shaft, a cam, a follower, a first spring, a control member, a second spring and a fixing seat. The shaft defines an outer screw thread. The cam has a cam surface, and a cam hole having an inner circumferential wall. The inner circumferential wall defines an inner screw thread. The outer screw thread of the shaft is meshed with the inner screw thread of the cam. The follower has a latching cam surface. The first spring provides an elastic force causing the cam surface of the cam and the latching cam surface of the follower to press against each other. The control member has at least one receiving groove. The second spring is positioned between the control member and the follower. The fixing seat has an outside circumferential wall and a bottom portion. The bottom portion includes at least one block in the circumferential wall and at least one slot adjacent to the at least one block. The at least one block is received in the at least one receiving groove of the control member.

Other advantages and novel features of the present hinge assembly will become more apparent from the following detailed description when taken in conjunction with the accompanying drawings.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views.

DETAILED DESCRIPTION OF THE EMBODIMENTS

Figure 1:
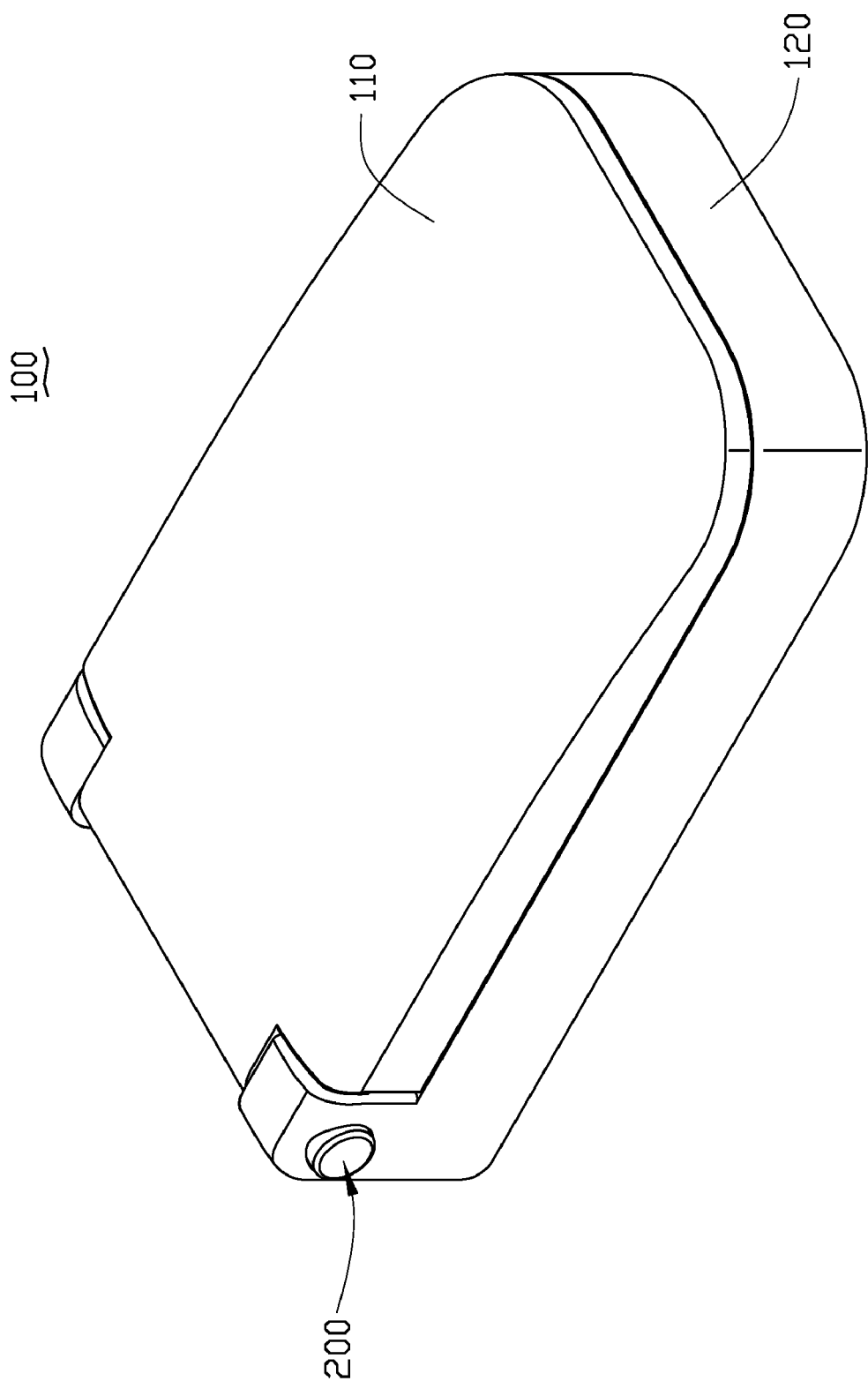
FIG. 1 is an isometric view of an embodiment of the present hinge assembly, as used in a mobile phone.

Referring now to the drawings in detail, FIG. 1 shows a hinge assembly 200, applied to a foldable electronic device 100 such as a flip type mobile phone, for pivotably coupling a cover section 110 and a body section 120. It is to be understood, however, that the hinge assembly 200 could be advantageously used in other environments (e.g. cabinet doors). As such, although proving particularly advantageous when used in foldable electronic devices, the hinge assembly 200 should not be considered limited in scope solely to foldable electronic devices.

Figure 2:
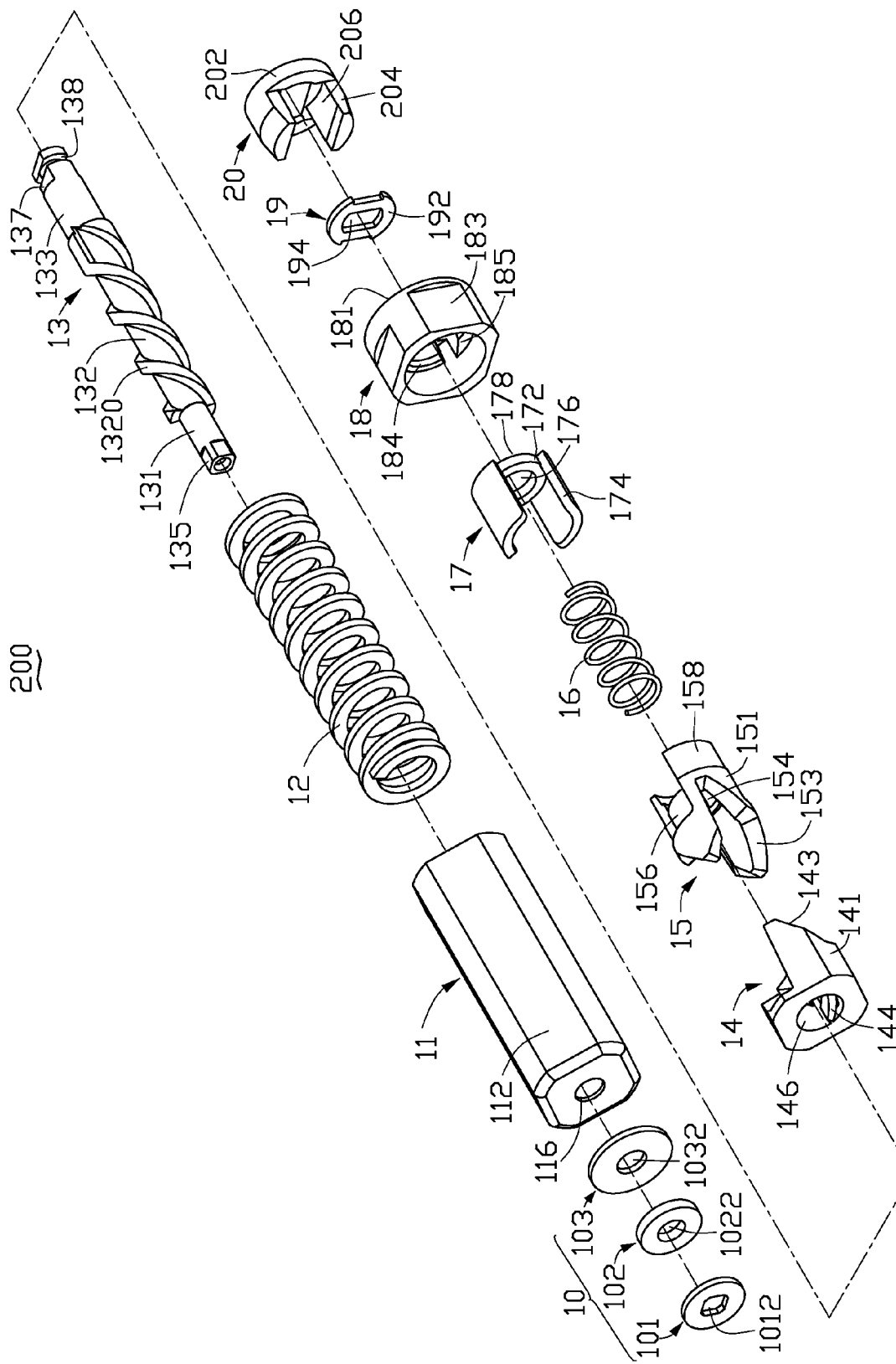
FIG. 2 is an exploded, isometric view of the embodiment of the hinge assembly shown in FIG. 1.
Figure 3:
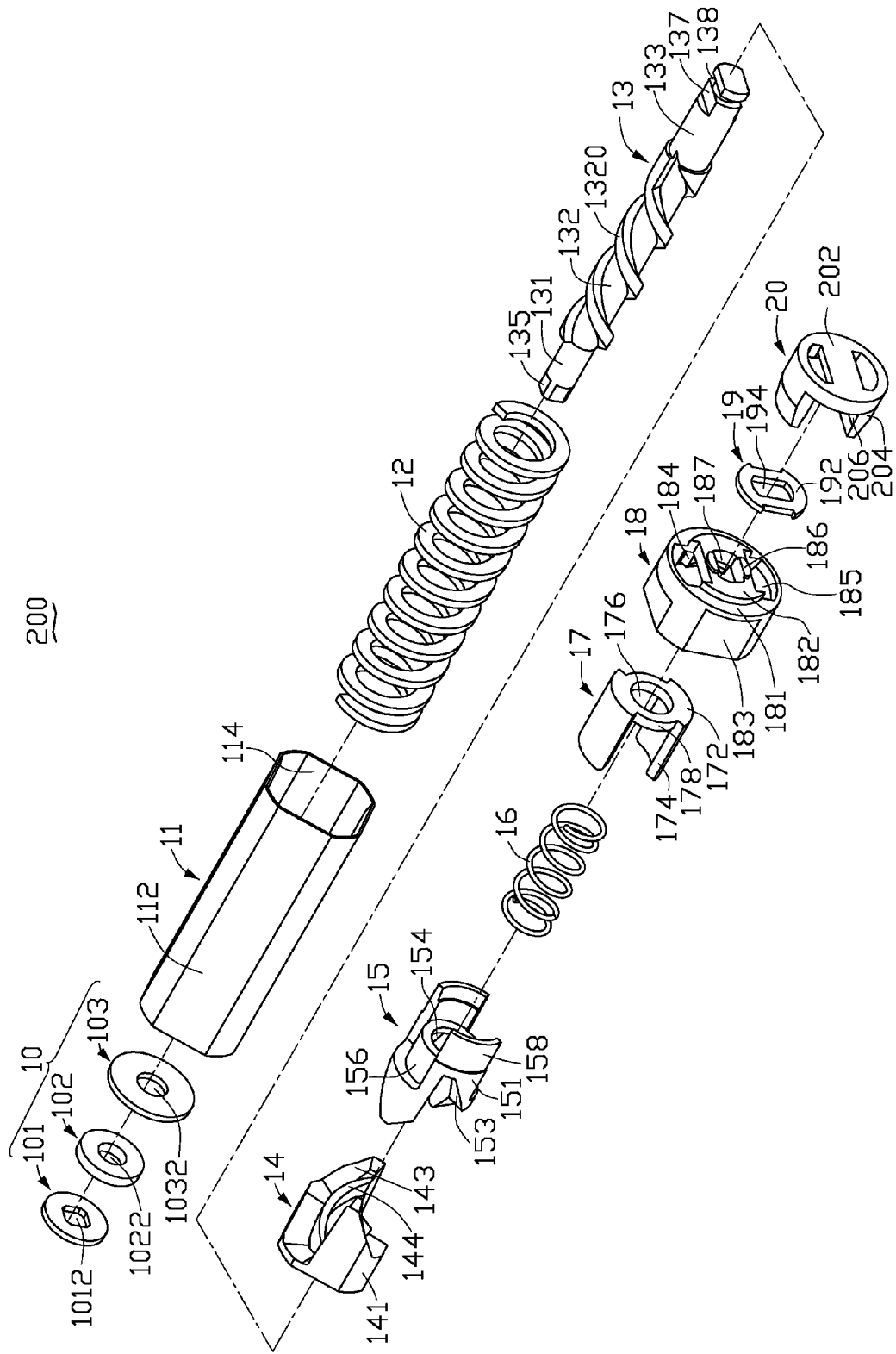
FIG. 3 is similar to FIG. 2, but viewed from another aspect.

Referring to FIGS. 2 and 3, the hinge assembly 200 in the embodiment illustrated includes a locking module 10, a sleeve 11, a first spring 12, a shaft 13, a cam 14, a follower 15, a second spring 16, a control member 17, a fixing seat 18, a latching ring 19 and a button 20. The first spring 12 and the cam 14 surround the shaft 13 at one end. The follower 15, the second spring 16, the control member 17 and the fixing seat 18, in that order, are placed on top of the other around an end of the shaft 13 opposite to the cam 14. The sleeve 11 receives the above-mentioned elements. The locking module 10 is fixed on the end of the shaft 13 with the cam 14, and the latching ring 19 is fixed on the opposite end of the shaft 13. The button 20 is further received in the fixing seat 18. Accordingly, the hinge assembly 200 is thus integrated into a whole.

The locking module 10 includes a locking ring 101, an anti-friction element 102 and a washer 103. The locking ring 101, the anti-friction element 102 and the washer 103 are substantially disk-shaped. The locking ring 101 defines a square hole 1012 in a central area thereof. The anti-friction element 102 and the washer 103 respectively define a circular/round hole 1022, 1032 in central areas thereof.

The sleeve 11 is substantially a hollow octagonal cylinder in shape, and has an outer wall 112 and an inner wall 114. The irregular outer wall 112 of the sleeve 11 may engage with the cover section 110 of the mobile phone 100 so that the sleeve 11 and the cover section 110 cannot rotate relative to each other. The sleeve 11 includes an open end and a half-closed end. The half-closed end of the sleeve 11 defines a through-hole 116 at a central area thereof.

The first spring 12 is a cylindrical helical spring (i.e., occupying a cylindrical volume). An outer diameter of the first spring 12 is smaller than a size of the inner wall 114 of the sleeve 11 so that the first spring 12 may be received in the sleeve 11.

The shaft 13 sequentially includes a primary portion 131, a threaded shaft portion 132 and an end shaft portion 133. A diameter of the primary portion 131 is smaller than or equal to that of the through-hole 116 of the sleeve 11, thus allowing the primary portion 131 to extend through the through-hole 116. The primary portion 131 has a retaining end 135 at a distal end thereof. The washer 103 and the anti-frictional element 102 may be placed around the retaining end 135. A sectional configuration of the retaining end 135 is non-circular, and the square hole 1012 of the locking ring 101 may be placed around and locked onto the retaining end 135. The threaded shaft portion 132 is positioned between the primary portion 131 and the end shaft portion 133. A diameter of the threaded shaft portion 132 is smaller than that of the first spring 12. The end shaft portion 133 is cylindrical in shape, and is flattened at a free end thereof along a section of the curved surface area forming a flat portion 137. A loop groove 138 is defined in the flat portion 137.

Figure 4:
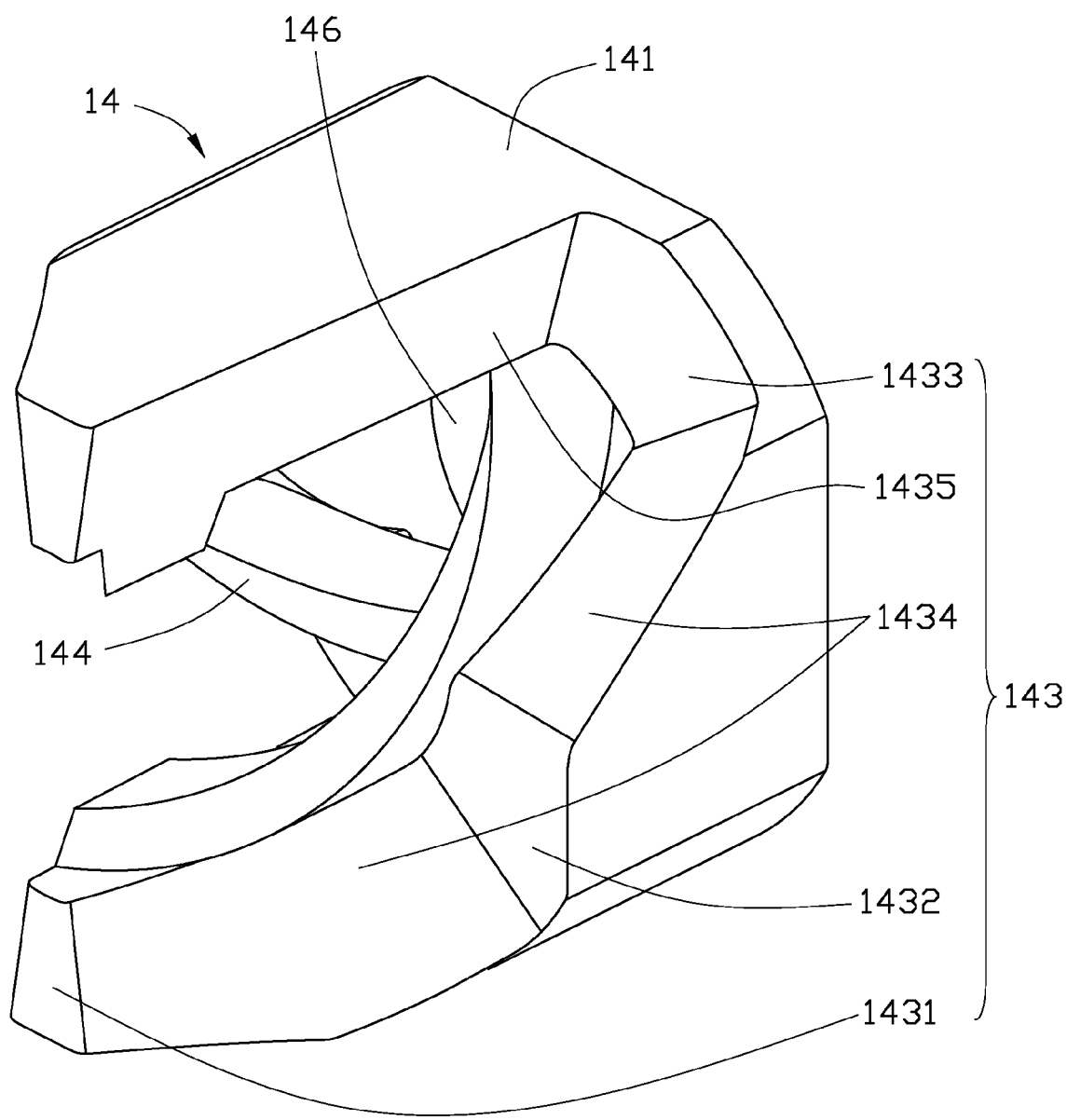
FIG. 4 is an enlarged view of the cam in FIG. 2.

Referring also to FIG. 4, the cam 14 is substantially cylindrical in shape, and has an octagonal outer wall 141. The size of the outer octagonal wall 141 matches that of the sleeve 11, so the cam 14 may be non-rotatably received in the sleeve 11. One end of the cam 14 has a cam surface 143. The cam surface 143 includes two symmetrical peaks 1431 and two symmetrical valleys 1433. The cam surface 143 has two sloped surfaces 1434 and a middle horizontal surface 1432 connected to each other between one peak 1431 and one valley 1433. The cam surface 143 has a perpendicular surface 1435 between another peak 1431 and the valley 1433. The cam 14 has an axis hole 146 defined by an inner wall thereof, and an inner thread 144 is defined in the inner wall of the cam 14.

Figure 5:
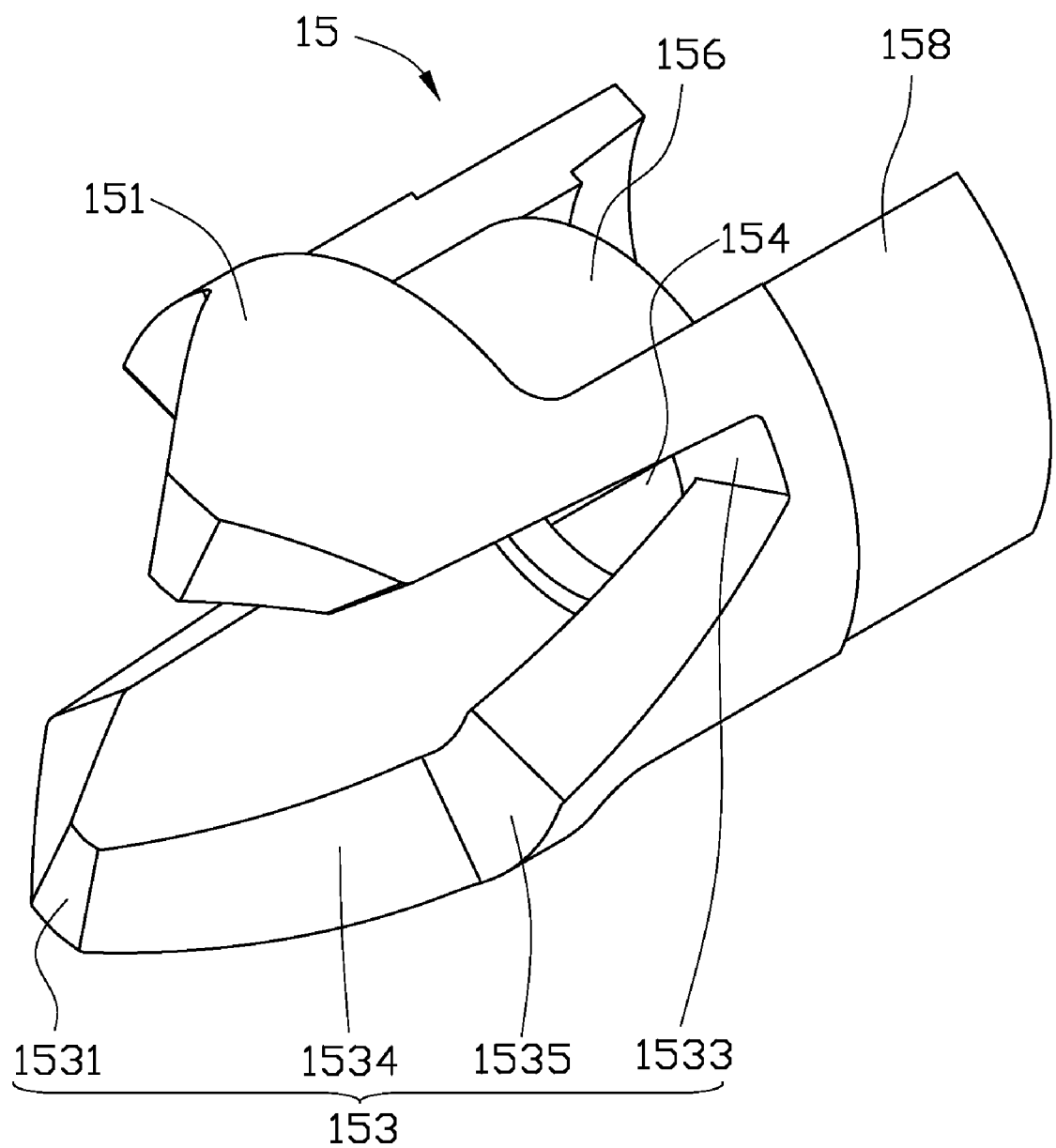
FIG. 5 is an enlarged view of the follower in FIG. 2.

Referring also to FIG. 5, the follower 15 is substantially a cylinder, and includes a cylindrical outer wall 151. One end of the follower 15 has a latching cam surface 153. The latching cam surface 153 includes two symmetrical peaks 1531 and two symmetrical valleys 1533, and engages with the cam surface 143 of the cam 14. Two sloped surfaces 1534 and a horizontal surface 1535 connects a peak 1531 and a valley 1533. The follower 15 has a stepped hole 154 defined in a center thereof. Two extending walls 158 extend from the other end of the follower 15 opposite to the latching cam surface 153. Two notches 156 are defined between the extending walls 158. The stepped hole 154 includes a large hole and a small hole. The large hole is adjacent to the latching cam surface 153, and the small hole is adjacent to the extending walls 158. Thus, a step between the large hole and the small hole is formed.

The second spring 16 is substantially cylindrical. A diameter of the second spring 16 is larger than the diameter of the end shaft portion 133 so that the second spring 16 may be placed around the shaft 13.

The control member 17 has a disk-shaped body 172. Two opposite arcuate latching walls 174 extend from a peripheral wall of the body 172, thereby forming two opposite latching grooves 178 at one side thereof. Each latching wall 174 may be received in a corresponding notch 156 of the follower 15, and each extending wall 158 of the follower 15 may be received in a corresponding receiving groove 178. A central hole 176 is defined in the body portion 172 so that the end shaft portion 133 may pass through the central hole 176 of the control member 17.

Figure 6:
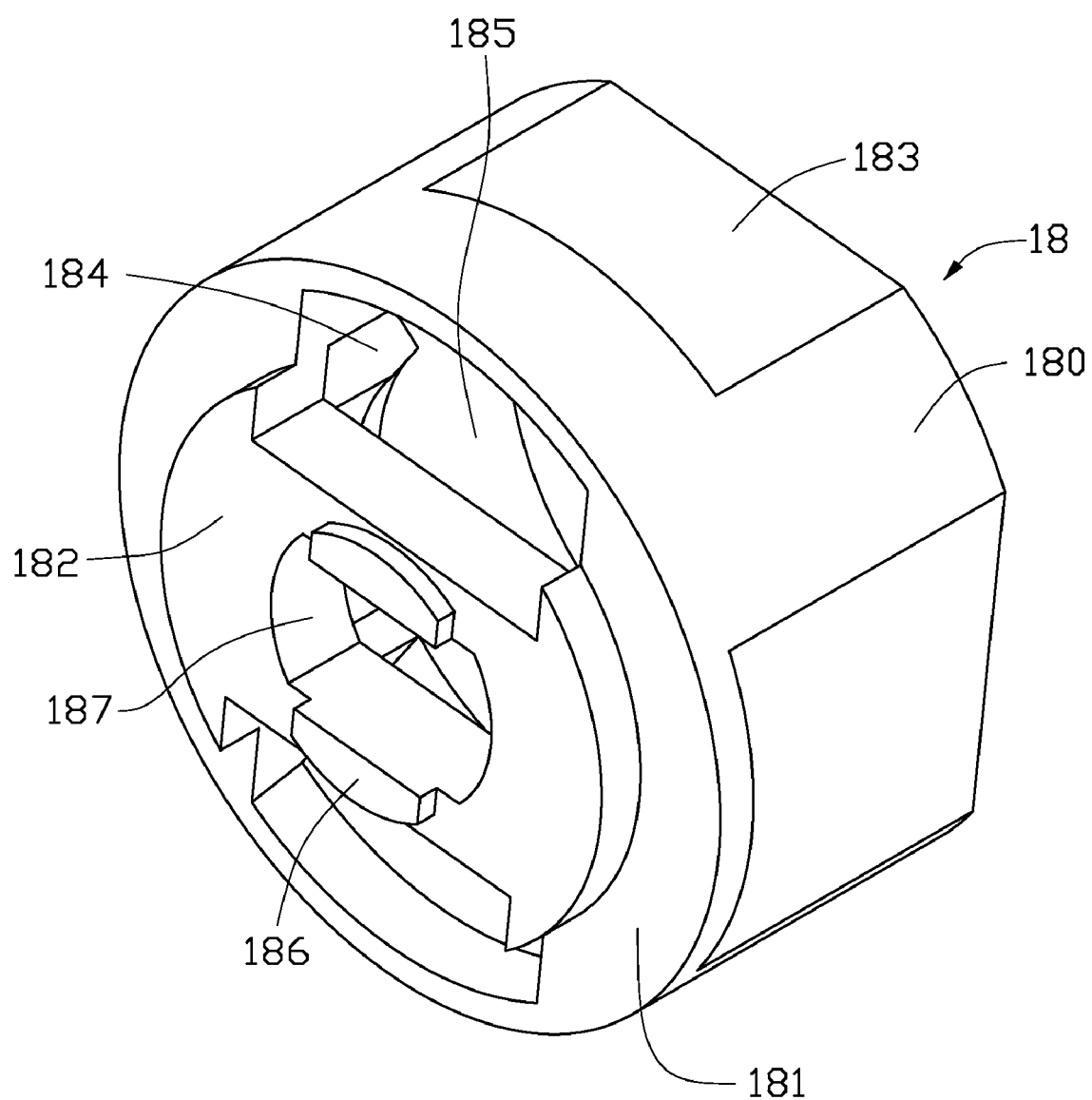
FIG. 6 is an enlarged view of the fixing seat in FIG. 2.
Figure 7:
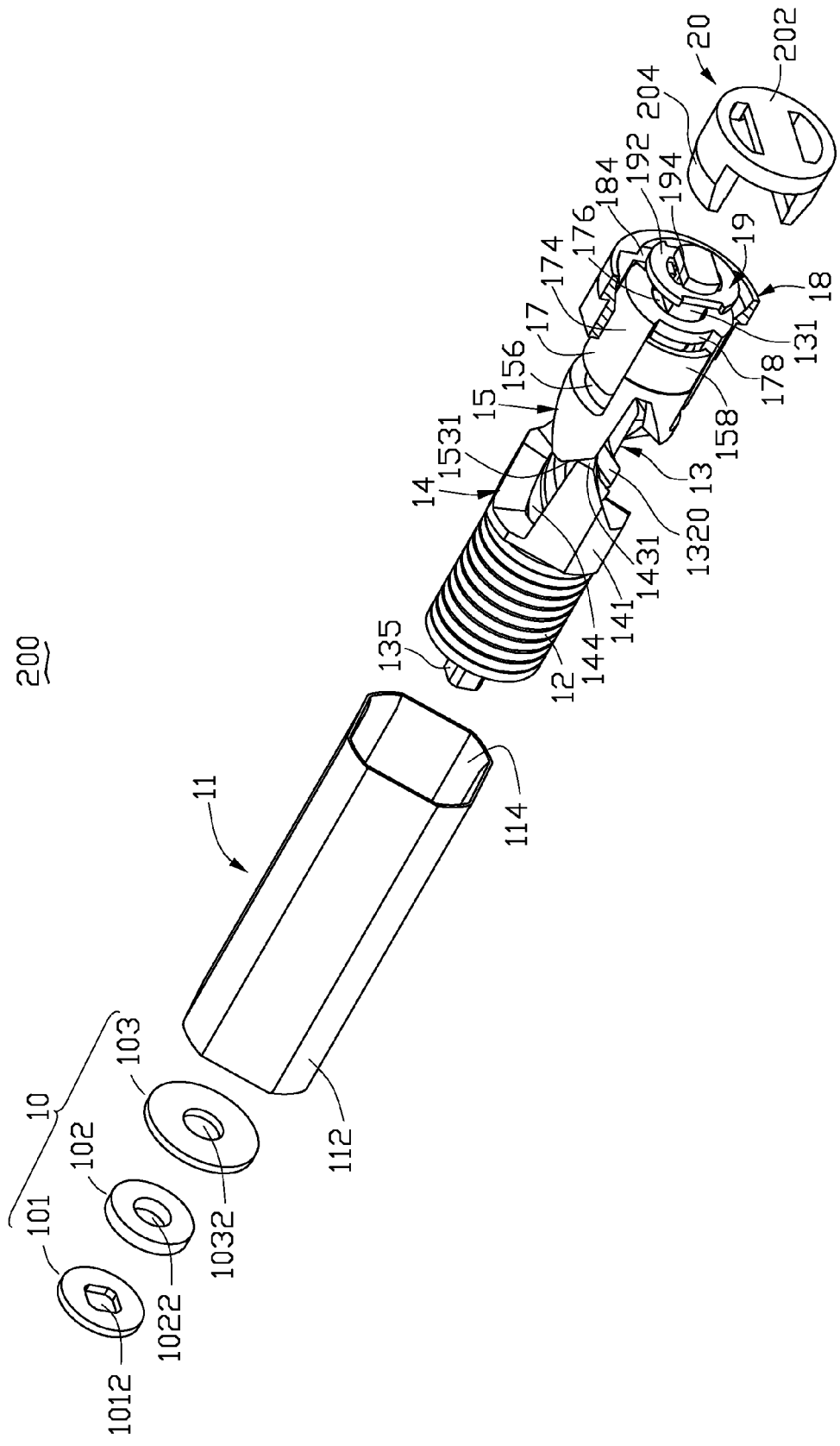
FIG. 7 is an partially assembled view showing the hinge assembly without the sleeve in FIG. 2.
Figure 8:
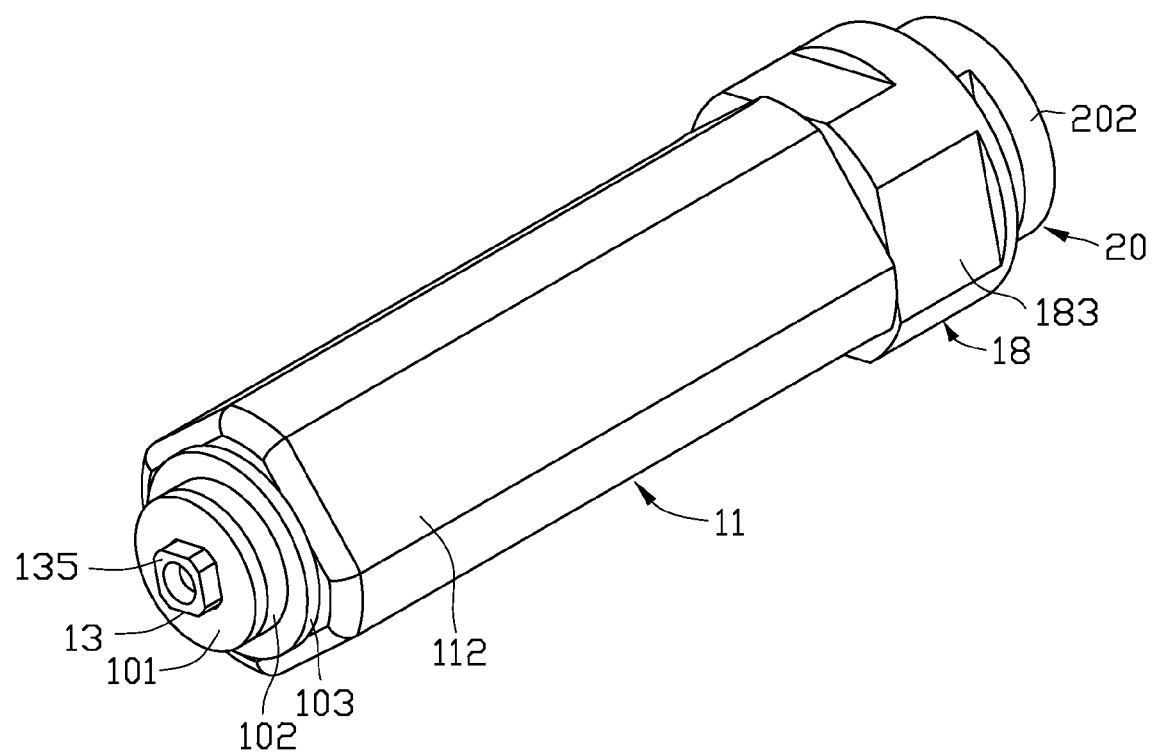
FIG. 8 is an assembled view showing the hinge assembly in FIG. 2.
Figure 9:
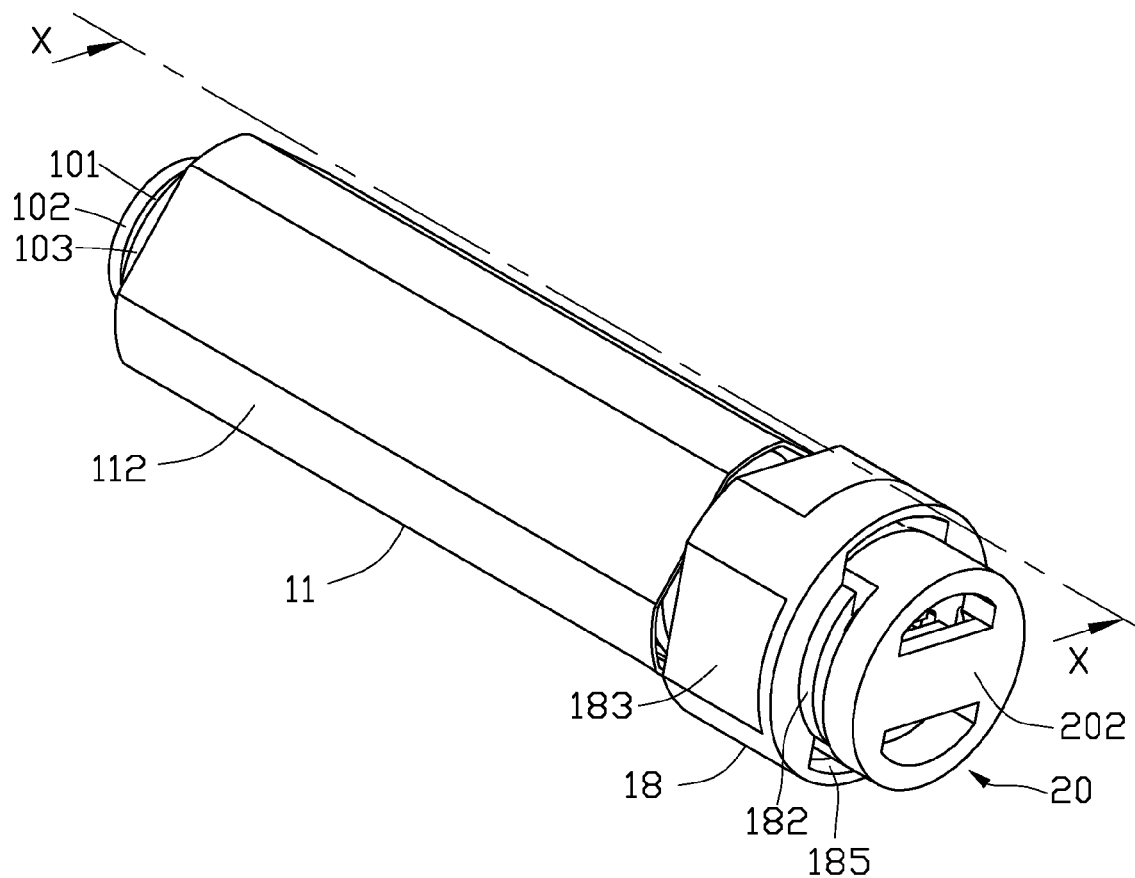
FIG. 9 is similar to FIG. 8, but viewed from another aspect.
Figure 10:
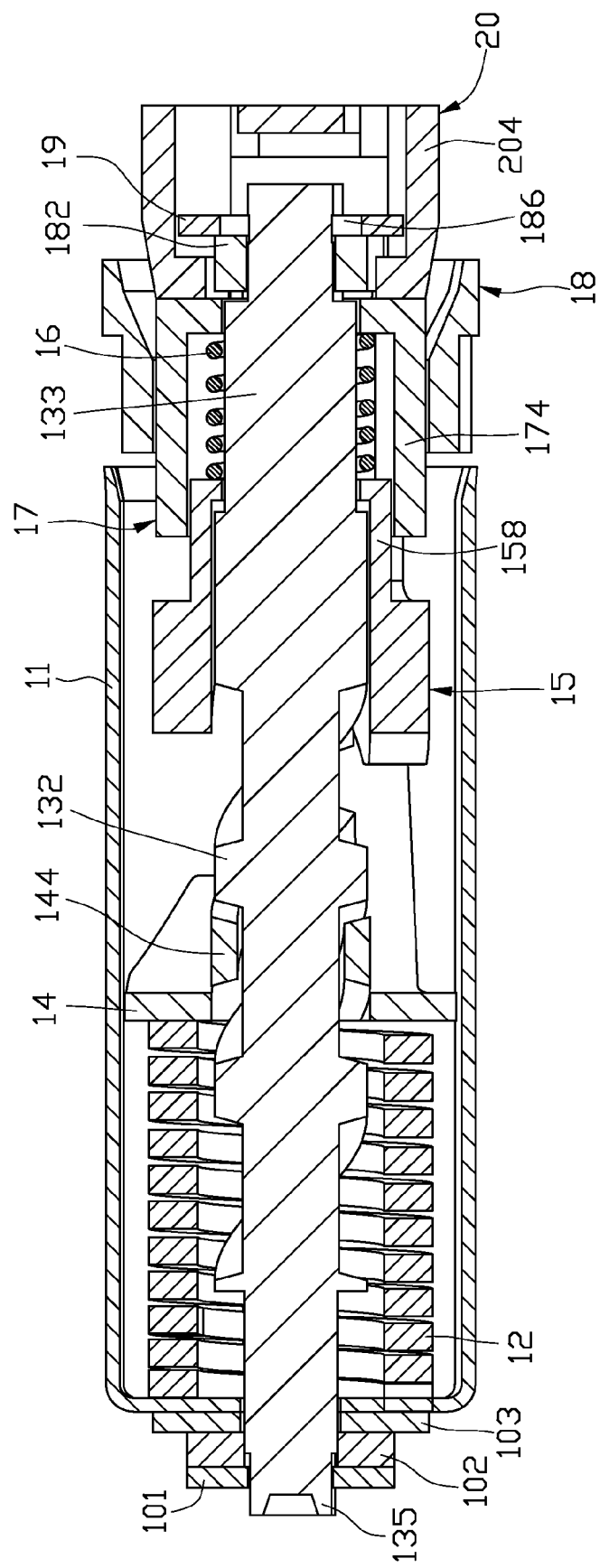
FIG. 10 is a cut-away view of FIG. 9 along X-X line.

Referring also to FIG. 6, the fixing seat 18 is substantially cylindrical in shape. The fixing seat 18 has an outside circumferential wall 180 and a bottom portion 181 connected with the outside circumferential wall 180. The outside circumferential wall 180 has a plurality of flat surfaces 183 defined therein so that the fixing seat 18 can be fixedly retained in the body section 120 of the foldable electronic device 100. A flange 182 extends from one side of the bottom portion 181, and two symmetrically spaced arcuate blocks 184 extend from an opposite side of the bottom portion 181. A connection between the bottom wall 181 and the flange 182 defines two symmetrical slots 185 along an axis line. Each slot 185 is adjacent to a corresponding arcuate block 184. A deformed through-hole 187 is defined in a central area of the flange 182 and the bottom portion 181. The shape and the size of the deformed hole 187 correspond to that of the flat portion 137 of the end shaft portion 133. Two protrusions 186 are formed on two sides of the deformed hole 187, and are positioned between the two slots 185.

The latching ring 19 is substantially ringlike in shape. The latching ring 19 has two arcuate portions 192, and a deformed hole 194 defined in a central area thereof. The shape and the size of the deformed hole 194 correspond to that of the flat portion 137 of the shaft 13.

The button 20 includes a disk-shaped board body 202, and two opposite arms 204 extending from one end of the board body 202. An arcuate recess 206 forms an inner side of each arm 204. Each arcuate portion 192 of the latching ring 19 may be received in a corresponding recess 206. As such, the latching ring 19 may be moveably received in the button 20.

In assembly, referring to FIGS. 7 to 10, the cam 14 is threaded onto the thread shaft portion 132, with the outer screw thread 1320 of the shaft 13 being engaged with the inner screw thread 144 of the cam 14.

After the cam 14 is placed around the shaft 13, the follower 15 passes through the end shaft portion 133 of the shaft 13, with the latching cam surface 153 of the follower 15 engaging with the cam surface 143 of the cam 14. The second spring 16 is placed around the shaft 13, with one end of the second spring 16 resisting one end of the follower 15. Then, the central hole 176 of the control member 17 is placed around the end shaft portion 133. The latching walls 174 of the control member 17 engage in the notches 156 of the follower 15 between the extending walls 158, and the extending walls 158 of the follower 15 are inserted into the receiving grooves 178 of the control member 17 so that the control member 17 is locked with the follower 15.

The fixing seat 18 is then placed around the control member 17. The flat portion 137 of the end shaft portion 133 of the shaft 13 extends out from the deformed hole 187 of the fixing seat 18. The blocks 184 of the fixing seat 18 engage in the receiving grooves 178 of the control member 17, thereby limiting the rotation of the control member 17 relative to the fixing seat 18.

The latching ring 19 is placed around the loop groove 138 of the flat portion 137, and is rotated 90 degrees so that the protrusions 186 are received into the deformed hole 194 of the latching ring 19 and the long side of the hole 194 offsets from the long side of the end of the shaft 13 adjacent the loop groove 138 to prevent the latching ring 19 withdrawing from the shaft 13. Accordingly, the above elements are fixed to the shaft 13. The arms 204 of the button 20 are inserted into the slots 185 of the fixing seat 18, and the arcuate portions 192 are received in the arcuate recesses 206 so as to fix the button 20 in the fixing seat 18. Thus, the arms 204 of the button 20 axially resist the latching walls 174 of the control member 17.

The first spring 12 is placed around the primary portion 131 of the shaft 13. The above-mentioned assembled elements are received into the sleeve 11 along one end of the assembled elements with the first spring 12. The octagonal wall 141 of the cam 14 engages in the octagonal inner wall 114 of the sleeve 11, and the primary portion 131 extends out from the half-closed end of the sleeve 11. Finally, the washer 103, the anti-friction element 102 are placed around the primary portion 131 of the shaft 13, and the locking ring 101 is tightly locked on the primary portion 131. Accordingly, the hinge assembly 200 is thus completely assembled.

Once the individual hinge component are assembled as described above, the hinge assembly 200 provides a self-contained component that can be sold as an off-the-shelf component or directly incorporated into a mobile phone or other device during manufacture. If incorporated into a mobile phone during manufacture, the sleeve 11 can engage in a cavity (not shown) of the cover section 110 of the mobile phone 100, and the fixing seat 18 can connect with the body section 120 of the mobile phone 100. When the cover section 110 of the mobile phone 100 is in a fully closed position, the peaks 1431 of the cam 14 resist the sloped surfaces 1534 adjacent to a valley 1533 so as to provide a force holding the cam 14 and the follower 15 in position. The first spring 12 exerts a predetermined pressure on the cam 14 so that the cam 14 has a tendency to rotate relative to the outer screw thread 1320 of the shaft 13. However, the cam 14 is prevented from rotating by the follower 15 and the control member 17.

In use, when a user wants to open the cover section 110 of the mobile phone 100 automatically, he/she may press the button 20. In this process, the button 20 moves along an axial direction of the shaft 13, the arms 204 of the button 20 then push the latching walls 174 of the control member 17 to move away from the button 20 in the axial direction of the shaft 13. The control member 17 moves axially, compressing the second spring 16 toward the follower 15. When the latching walls 174 of the control member 17 break away from the limitation of the blocks 184 of the fixing seat 18, the follower 15 first rotates through a small angle so that the peaks 1431 of the cam 14 slide into the valleys 1533 of the follower 15. The cam 14 then rotates relative to the shaft 13 along the outer screw thread 1320 under urging of the first spring 12.

When the cam 14 rotates, the follower 15, the second spring 16 and the control member 17 move and rotate. Furthermore, the cam 14 brings the sleeve 11 to rotate so that the cover section 110 of the mobile phone 100 is opened. Whilst the sleeve 11 rotates relative to the shaft 13, the anti-friction element 102 directly contacts the washer 103. The washer 103 may improve the strength of the sleeve 11. The anti-friction element 102 may greatly decrease the abrasion between the sleeve 11 and the locking ring 101.

The cam 14 stops rotating when the cover section 110 of the mobile phone 100 is completely opened. The elastic potential energy of the second spring 16 then pushes the control member 17 to move toward the button 20. Accordingly, the latching walls 174 of the control member 17 are locked between the blocks 184 of the fixing seat 18.

When the cover section 110 of the mobile phone 100 is being closed, the cover section 110 can be closed by hand by pushing the sleeve 11 to rotate relative to the body section 120. The sleeve 11 further brings the cam 14 to rotate along the outer screw thread 1320 of the shaft 13. Because the control member 17 is locked into the blocks 184 of the fixing seat 18, the control member 17 cannot rotate relative to the fixing seat 18. Accordingly, the follower 14 does not rotate relative to the fixing seat 18. Since a thread distance of the outside thread 1320 is smaller than a distance of the follower 15 backing off, the cam 14 rotates relative to the follower 15 and the inner thread 144 of the cam 14 breaks away from the outside thread 1320 of the shaft. When the cam 14 rotates, the follower 15 is pushed toward the button 20. When the peaks 1431 of the cam 14 slide to the horizontal surfaces 1535 of the follower 15, with no outside force acting on it, the hinge assembly 200 can be held in a steady state in any of a variety of selectable positions. When the cam 14 passes over the peaks 1531 of the follower 15, the first spring 12 accumulates elastic potential energy. When it stops exerting force, the cam 13 automatically slides into the valleys 1533 of the follower 15 along the latching cam surface 153 of the follower 15. Accordingly, the cover section 110 becomes closed relative to the body section 120 of the mobile phone 100. The hinge assembly 200 may be opened manually. The principles of the manual opening process are basically the same as the manual closing process.

In an alternative embodiment, the first spring 12 and the second spring 16 may be replaced by other elastic elements such as an elastic sponge.

In an alternative embodiment, the configuration of the cam surface 143 of the cam 14 may be different from the latching cam surface 153 of the follower as long as the cam surface 143 does not interfere with the latching cam surface 153 of the follower 15.

As described above, the present invention provides a hinge assembly 200 for use with various portable devices, beyond the mobile phone illustrated, and/or with other devices needing a hinge assembly that selectably facilitates the achievement of fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge assembly, comprising:
    a shaft defining an outer screw thread;
    a cam having a cam surface, the cam defining a cam hole having an inner circumferential wall, the inner circumferential wall defining an inner screw thread, the outer screw thread of the shaft meshed with the inner screw thread of the cam;
    a follower having a latching cam surface;
    a first spring providing an elastic force causing the cam surface of the cam and the latching cam surface of the follower to resist each other;
    a control member having at least one receiving groove;
    a second spring positioned between the control member and the follower;
    a fixing seat placed around the control member, the fixing seat having an outside circumferential wall and a bottom portion, the bottom portion including at least one block in the circumferential wall and at least one slot adjacent to the at least one block; the at least one block being received in the at least one receiving groove of the control member so as to lock the control member into the fixing seat; and
    a locking module having a locking ring and an anti-friction element, the locking ring being fixed on one end of the shaft, and the anti-friction element positioned on the shaft by the locking ring.

2. The hinge assembly as claimed in claim 1, further comprising a button, wherein the button has at least one arm, the at least one arm is received in the at least one slot of the fixing seat and resists the control member, the button being pressable to drive the control member to move away from the button to thereby allow the fixing seat releasing the control member which results in the cam together with the follower and the control member being rotatable along the outer screw thread of the shaft under urging of the first spring.

3. The hinge assembly as claimed in claim 2, wherein the number of the arm is two, the number of the slot is two, and each arm is received in a corresponding slot of the fixing seat and resists the control member.

4. The hinge assembly as claimed in claim 1, further comprising a button and a latching ring, wherein the button has two arms, the number of the slot is two, the arms are received in the slots of the fixing seat and resist the control member, the latching ring is fixed on one end of the shaft, each arm defines a recess, and two ends of the latching ring is contained in the recesses so as to fix the button to the fixing seat.

5. The hinge assembly as claimed in claim 1, wherein the locking module includes a washer, the washer are fixed on the end of the shaft, the anti-friction element is positioned between the locking ring and the washer.

6. The hinge assembly as claimed in claim 1, wherein the shaft includes a primary portion, a threaded shaft portion and an end shaft portion, the threaded shaft portion is positioned between the primary portion and the end shaft portion.

7. The hinge assembly as claimed in claim 6, wherein the primary portion has a retaining end at a distal end thereof, and a locking ring is placed around the retaining end.

8. The hinge assembly as claimed in claim 7, wherein the end shaft portion is cylindrical in shape, and is flattened at a free end thereof along a section parallel to an axis of the shaft to form a flat portion, and a loop groove is defined in the flat portion.

9. The hinge assembly as claimed in claim 1, further comprising a sleeve, wherein the sleeve includes an open end and a half-closed end, the half-closed end of the sleeve defines a through-hole at a central area thereof, the first spring, the cam, the follower, and the shaft are received in the sleeve, and one end the shaft extending from the through-hole of the sleeve.

10. The hinge assembly as claimed in claim 1, wherein the latching cam surface of the follower includes two peaks and two valleys, and a horizontal surface and two sloped surfaces are formed between one peak and one valley.

11. A hinge assembly of a foldable electronic device comprising a main body and a flip cover, the hinge assembly comprising:
   a hinge shaft comprising an outer screw thread thereon;
   a driving cam attached around the hinge shaft, the cam having an inner screw thread formed on an inner periphery thereof, the inner screw thread meshed with the outer screw thread in such a manner that the cam tends to rotate with respect to the hinge shaft upon being pushed axially, the cam having a first cam surface formed on one end thereof the cam being configured so as to be fixed relative to one of the main body and the flip cover;
   a driven cam attached around the hinge shaft, the driven cam having a second cam surface engaging with the first cam surface; the second cam surface including a flat surface perpendicular to the axis of the hinge shaft;
   an elastic member biasing against the driving cam toward the driven cam to axially push the driving cam;
   a fixing seat configured so as to be fixed relative to the other of the main body and the flip cover;
   a control member fixed relative to the driven cam along a circumferential direction of the driving cam, the control member being movable axially between a locked position where the control member is engaged with the fixing seat in a manner so as to prevent the control member and the cams from rotating relative to the fixing seat, and an unlocked position where the control member is released from the fixing seat and the control member and the cams are movable relative to the fixing seat;
   another elastic member biasing the control member toward the fixing seat, and
   a sleeve, the first spring and the cams being received in the sleeve, the shaft extending through the sleeve with opposite ends thereof exposed from ends of the sleeve, and the sleeve non-rotatably connecting with the driving cam.

12. The hinge assembly as claimed in claim 11, wherein the shaft includes a primary portion, a threaded shaft portion and an end shaft portion, the threaded shaft portion is positioned between the primary portion and the end shaft portion, the primary portion has a retaining end at a distal end thereof a locking module disposed outside of the sleeve is fixed on the retaining end, and a latching ring is placed around the end shaft portion.

13. The hinge assembly as claimed in claim 11, wherein the control member comprises a pair of spaced latching walls extending along an axis of the shaft and a pair of through grooves formed between the latching walls, and the fixing seat comprises a circumferential wall in which the control member is received and a bottom portion, the latching walls of the control member engaging with the driven cam in the circumferential direction, two spaced arcuate blocks formed in an inner surface of the circumferential wall of the fixing seat and received in the respective grooves of the control member in the locked position to thereby prevent the control member and the cams from rotating relative to the fixing seat.

14. The hinge assembly as claimed in claim 12, wherein the end shaft portion is cylindrical in shape, and is flattened at a free end thereof along a section of the curved surface area forming a flat portion, and a loop groove is defined in the flat portion.

15. A foldable electronic device having a main body and a flip cover hinged together by a hinge assembly, the hinge assembly comprising:
   a cam having a cam surface, the cam including a cam hole having an inner circumferential wall surrounding the hole, the inner circumferential wall defining an inner screw thread, the driving cam being fixed with respect to the cover;
   a shaft extending through the cam hole of the cam and defining an outer screw thread meshed with the inner screw thread of the cam;
   a follower having a latching cam surface, the latching cam surface of the follower including two peaks and two valleys, and a horizontal surface and two sloped surfaces being formed between each peak and each valley, wherein the cam slides to the horizontal surfaces of the follower with no outside force acting on it, the hinge assembly can be held in a steady state in any of a variety of selectable positions;
   a first spring providing an elastic force to make the cam surface of the cam and the latching cam surface of the follower resist each other;
   a control member pivotably mounted around the shaft having at least one receiving groove;
   a second spring positioned between the control member and the follower; and
   a fixing seat fixed with respect to the main body and placed around the shaft, the fixing seat having an outside circumferential wall around the control member and a bottom portion, two spaced blocks extending inward from the bottom portion; each block being received in a corresponding receiving groove of the control member to prevent the control member and the cams from rotating relative to the fixing seat;

wherein the control member is pressable to axially move away from the bottom portion of the fixing seat to disengage from the blocks of the fixing seat so that the driving cam and the cover together with the driven cam and the control member are rotatable relative to the fixing seat and the main body along the outer screw thread of the shaft under press of the elastic force of the first spring.

16. The foldable electronic device as claimed in claim 14, further comprising a button, wherein the bottom portion of the fixing seat defines two slots, the button has two arms, each arm extends through a corresponding slot of the fixing seat and resists the control member axially.

17. The foldable electronic device as claimed in claim 15, further comprising a latching ring, wherein each arm defines a recess, the latching ring is passable over an end of the shaft and fixed on the end of the shaft after being rotated an angle relative to the shaft, and two ends of the latching ring are contained in the recesses so as to fix the button to the fixing seat.

* * * * *

UNITED STATES PATENT AND TRADEMARK OFFICE
CERTIFICATE OF CORRECTION

PATENT NO.        : 7,647,674 B2
APPLICATION NO. : 11/617128
DATED             : January 19, 2010
INVENTOR(S)       : Duan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 209 days.

Signed and Sealed this

Sixteenth Day of November, 2010

David J. Kappos
*Director of the United States Patent and Trademark Office*